Figure 1:
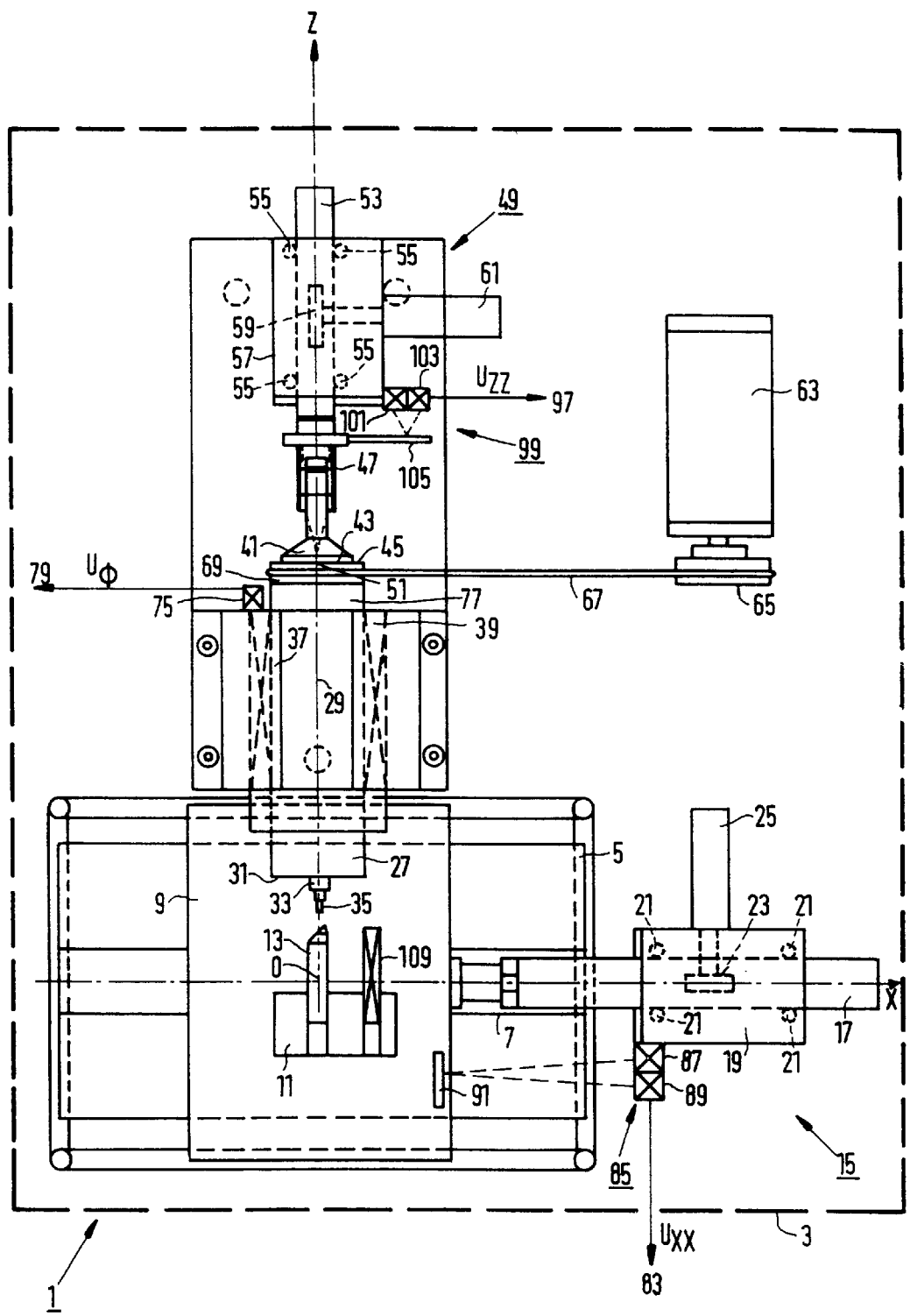

United States Patent

Van Tooren et al.

[11] Patent Number: 5,831,734
[45] Date of Patent: Nov. 3, 1998

[54] METHOD OF MEASURING A REFERENCE POSITION OF A TOOL RELATIVE TO A WORKPIECE, AND MACHINE TOOL FOR CARRYING OUT SAID METHOD

[75] Inventors: Arie Van Tooren; Gerrit H. Van Gool; Johannes H.F.M. Van Leest; Johan C. Wijn, all of Eindhoven, Netherlands

[73] Assignee: U.S. Philips Corporation, New York, N.Y.

[21] Appl. No.: 550,126

[22] Filed: Oct. 27, 1995

[30] Foreign Application Priority Data

Oct. 31, 1994 [EP] European Pat. Off. ............. 94203163

[51] Int. Cl.$^6$ .................................................. G01B 11/14
[52] U.S. Cl. ............................................................. 356/375
[58] Field of Search .................................. 356/375, 152.1, 356/400, 139.03, 199.1, 372, 241, 135, 376, 377, 378, 379, 380, 384; 250/560; 318/568, 640, 653, 572, 561

[56] References Cited

U.S. PATENT DOCUMENTS

| | | | |
|---|---|---|---|
| 4,123,695 | 10/1978 | Hale et al. | 318/561 |
| 4,645,993 | 2/1987 | Naito et al. | 318/568 |
| 4,803,372 | 2/1989 | Hirata et al. | 250/561 |
| 4,884,889 | 12/1989 | Beckwith, Jr. | 356/375 |
| 4,892,407 | 1/1990 | McMurtry et al. | 356/375 |
| 4,916,293 | 4/1990 | Cartlidge et al. | 235/375 |
| 4,950,079 | 8/1990 | McMurtry et al. | 356/358 |
| 5,005,978 | 4/1991 | Skunes et al. | 356/372 |
| 5,091,861 | 2/1992 | Geller et al. | 364/474.34 |
| 5,392,122 | 2/1995 | Ulanov et al. | 356/372 |
| 5,532,815 | 7/1996 | Kipman et al. | 356/139.03 |

FOREIGN PATENT DOCUMENTS

0602724A1  6/1994  European Pat. Off. .

OTHER PUBLICATIONS

"An Ultra–Precision Machining Method or the Workpiece–Referred Form Accuracy Control System", by T. Kohno et al, The International Conf. on Advanced Mechatronics, pp. 143–146, May 1989.

Primary Examiner—Frank G. Font
Assistant Examiner—Michael P. Stafira
Attorney, Agent, or Firm—Anne E. Barschall

[57] ABSTRACT

In a method for measuring a reference position of a tool relative to a workpiece, the tool is fastened to a first holder of a machine tool. The workpiece is to be manufactured using the tool and is fastened to a second holder of the machine tool. The tool provides a distinguishing mark on the workpiece in a predetermined reference position of the first holder relative to the second holder. Subsequently, the distinguishing mark is detected by a sensor. Therefore, the reference position of the tool relative to the workpiece is determined from a position of the first holder relative to the second holder. The tool and the sensor are fastened in fixed, permanent positions relative to one another and relative to the first holder. The accuracy of measurement of the position of the tool depends exclusively on the accuracy of positioning of the first holder relative to the second holder. The accuracy of machining the workpiece is not hurt by the accuracy of measurement of the reference position of the tool relative to the workpiece. The sensor may be optical, with a focusing error detector. The second holder may be rotatable about a Z-axis, with the first holder being displaceable parallel to an X-axis which is perpendicular to the Z-axis, and the distinguishing mark being a circular groove in a surface of the workpiece which extends perpendicularly to the Z-axis.

19 Claims, 5 Drawing Sheets

5,831,734

METHOD OF MEASURING A REFERENCE POSITION OF A TOOL RELATIVE TO A WORKPIECE, AND MACHINE TOOL FOR CARRYING OUT SAID METHOD

The invention relates to a method of measuring a reference position of a tool, which is fastened to a first holder of a machine tool, relative to a workpiece to be manufactured by means of the tool, which workpiece is fastened to a second holder of the machine tool, the holders being displaced relative to one another by means of a positioning device, by which method a distinguishing mark is applied to the workpiece by the tool in a previously determined reference position of the positioning device and subsequently a sensor and the workpiece are displaced relative to one another by the positioning device, the reference position of the tool relative to the workpiece being determined from a position of the positioning device in which the distinguishing mark is detected by the sensor.

The invention also relates to a method of manufacturing a workpiece by means of a tool, in which method a reference position of the workpiece relative to the tool is measured by a method according to the invention.

The invention also relates to a machine tool with a first holder for a tool, a second holder for a workpiece to be manufactured by means of the tool, a positioning device with which the holders are displaceable relative to one another, and a control member for controlling the positioning device, the positioning device being controllable by the control member for the purpose of measuring a reference position of the tool relative to the workpiece in accordance with a control program according to which the tool applies a distinguishing mark to the workpiece in a previously determined reference position of the positioning device, and the positioning device subsequently displaces a sensor and the workpiece relative to one another, the reference position of the tool relative to the workpiece being determined from a position of the positioning device in which the sensor detects the distinguishing mark.

BACKGROUND OF THE INVENTION

A method of the kind mentioned above for measuring a reference position of a tool relative to a workpiece, a method of the kind mentioned above for manufacturing a workpiece by means of a tool, and a machine tool of the kind mentioned above are generally known. Such machine tools for carrying out the known methods are often provided with a magazine for a large number of tools, the tool fastened to the first holder being exchangeable with one of the tools from the magazine by means of an exchange mechanism. The sensor mentioned above, for example a mechanical feeler, is also present in the magazine of such a machine tool.

According to the generally known method of measuring a reference position of a tool relative to a workpiece, the positioning device of the machine tool is moved into a predetermined reference position in which the first holder and the second holder are in a given position relative to one another. In this reference position of the positioning device, a distinguishing mark is provided on the workpiece fastened to the second holder by means of the tool fastened to the first holder. If the machine tool is, for example, a lathe in which the second holder with the workpiece is rotatable about an axis of rotation, the distinguishing mark is, for example, an incision provided in the rotating workpiece by the tool. If the machine tool is, for example, a milling machine, in which the first holder with the tool is rotatable about an axis of rotation, the distinguishing mark is, for example, a recess made in the workpiece by the rotating tool. After this, the tool is exchanged with the sensor, the sensor being fastened to the first holder by means of the exchange mechanism. The sensor and the workpiece are subsequently displaced relative to one another by the positioning device, the sensor scanning the workpiece. The moment the sensor detects the distinguishing mark, the positioning device is in a position which defines a reference position of the tool relative to the workpiece. Owing to, for example, inaccuracies in the position of the tool relative to the first holder, of the first holder relative to the positioning device, of the positioning device relative to a frame of the machine tool, of the second holder relative to the frame of the machine tool, and of the workpiece relative to the second holder, this reference position of the tool relative to the workpiece will usually differ from the reference position of the positioning device in which the distinguishing mark was provided by the tool. A correction is calculated for the reference position of the positioning device in that the reference position of the tool relative to the workpiece thus measured is compared with the reference position of the positioning device, so that the reference position of the positioning device corresponds to the reference position of the tool relative to the workpiece, and the workpiece can be manufactured in an accurate manner by the tool in spite of the above inaccuracies in the mutual positions of the above components of the machine tool.

The reference position of the tool relative to the workpiece is usually measurable to an accuracy in the micron range by means of the known method in known machine tools, i.e. to an accuracy of one to several micrometers, so that the workpiece to be manufactured by the tool has a dimensional accuracy which also lies in the micron range, given a suitable positioning accuracy of the positioning device. The accuracy with which the reference position of the tool relative to the workpiece can be measured in the known machine tool by the known method, however, is insufficient for the manufacture of workpieces with a dimensional accuracy in the sub-micron range, where the tool must be positioned relative to the workpiece with positioning accuracies of the order of 0.1 $\mu$m or better. This accuracy in the known machine tool is in fact limited by the so-called transfer error of the exchange mechanism which is caused by the limited accuracy with which the tool and the sensor can be fastened to the first holder by means of the exchange mechanism. The transfer error causes a deviation between the positions relative to the first holder of the tool with which the distinguishing mark is provided and of the sensor with which the distinguishing mark is detected, while also a deviation arises between the position occupied by the tool relative to the first holder during the application of the distinguishing mark and the position occupied by this same tool relative to the first holder during the subsequent manufacture of the workpiece.

SUMMARY OF THE INVENTION

It is an object of the invention to provide a method of measuring a reference position of a tool relative to a workpiece, as well as a machine tool of the kind mentioned in the opening paragraphs whereby the reference position of the tool relative to the workpiece can be measured with an accuracy in the sub-micron range, so that the product to be manufactured by means of the tool, given a suitable positioning accuracy of the positioning device, has a dimensional accuracy which also lies in the sub-micron range.

According to the invention, the method of measuring a reference position of a tool relative to a workpiece is for this purpose characterized in that the tool and the sensor are fastened in fixed, permanent positions relative to one another and relative to the first holder before the distinguishing mark is provided.

According to the invention, the machine tool is for this purpose characterized in that the tool and the sensor are fastened in fixed, permanent positions relative to one another and relative to the first holder during operation.

Since the tool and the sensor are fastened in fixed, permanent positions relative to one another and relative to the first holder during the provision and detection of the distinguishing mark, the position of the tool relative to the sensor has an accuracy which is determined by the mechanical stiffness and the coefficient of thermal expansion of the first holder and which is comparatively high in relation to the required dimensional accuracy of the workpiece to be manufactured as a result of a suitable design of the first holder. The accuracy with which the reference position of the tool relative to the workpiece can be measured by the method according to the invention and on the machine tool according to the invention, accordingly, is exclusively determined by the positioning accuracy of the positioning device of the machine tool. Through the use of a suitable positioning device with a positioning accuracy in the sub-micron range, therefore, the reference position of the tool relative to the workpiece can be measured with an accuracy in the sub-micron range by the method according to the invention and on the machine tool according to the invention, so that the workpiece to be subsequently manufactured by means of the tool has a dimensional accuracy which also lies in the sub-micron range.

According to the invention, a method of manufacturing a workpiece by means of a tool, in which method a reference position of the workpiece relative to the tool is measured by means of a method according to the invention, is characterized in that, for the purpose of manufacturing the workpiece, the positioning device is displaced into consecutive positions which each correspond to a sum of a position supplied to the positioning device and a difference between the reference position of the positioning device and the measured reference position of the tool relative to the workpiece.

A special embodiment of a machine tool according to the invention is characterized in that, for the purpose of manufacturing the workpiece, the positioning device is displaceable into consecutive positions in accordance with the control program, which positions each correspond to a sum of a position of the positioning device supplied to the control program by a user of the machine tool and a difference between the reference position of the positioning device and the measured reference position of the tool relative to the workpiece.

Since the consecutive positions of the positioning device each correspond to the sum of a position supplied to the positioning device and the difference between the reference position of the positioning device and the measured reference position of the tool relative to the workpiece, it is achieved that the tool is brought into a desired position relative to the workpiece by the positioning device, provided the position supplied to the positioning device is equal to the desired position of the tool relative to the workpiece. The consecutive positions of the positioning device may thus be supplied by the user in a clear form.

A further embodiment of a machine tool according to the invention is characterized in that the sensor is an optical detector. The use of an optical detector implies that the measurement of the reference position of the tool relative to the workpiece is carried out in a contactless manner, so that no inaccuracies in the measurement are caused by mechanical friction or hysteresis between the sensor and the workpiece.

A yet further embodiment of a machine tool according to the invention is characterized in that the optical detector is provided with a light source, an objective lens system for focusing the light radiated by the light source onto the workpiece, and a focusing error detector. The focusing error detector of the optical detector detects whether the focus of the light radiated by the light source and reflected back by a surface of the workpiece is on the surface of the workpiece. When the light hits the distinguishing mark provided, the focusing error detector will detect a focusing error, signifying that the distinguishing mark is detected. Such a focusing error detector has a high sensitivity, i.e. it supplies an electrical output signal which is comparatively great in relation to the focusing error detected (e.g. a voltage of 10 V for a focusing error of 10 $\mu$m). This means that the distinguishing mark to be provided need have small dimensions only, and the measurement carried out by means of the focusing error detector is particularly accurate.

A special embodiment of a method according to the invention for measuring a reference position of a tool relative to a workpiece, and a special embodiment of a method according to the invention for manufacturing a workpiece by means of a tool, in which method the second holder is rotated about an axis of rotation and the first holder is displaced relative to the second holder parallel to an X-axis directed perpendicularly to the axis of rotation by means of the positioning device, are characterized in that the workpiece is provided with a surface which extends perpendicularly to the axis of rotation, while the distinguishing mark is a circular groove provided by the tool in said surface.

A particular embodiment of a machine tool according to the invention, in which the second holder is rotatable about an axis of rotation and the first holder is displaceable relative to the second holder parallel to an X-axis directed perpendicularly to the axis of rotation by means of the positioning device, is characterized in that the distinguishing mark is a circular groove which is provided by the tool in a surface of the workpiece which extends perpendicularly to the axis of rotation.

Such a circular groove may be provided in a simple manner and in a comparatively short time by the tool, and can also be detected in a comparatively short time by the sensor in that the latter is displaced by the positioning device parallel to said surface of the workpiece.

A further embodiment of a method according to the invention for measuring a reference position of a tool relative to a workpiece, and a further embodiment of a method according to the invention for manufacturing a workpiece by means of a tool, are characterized in that the reference position of the tool relative to the workpiece is determined from a diameter of the circular groove which is measured by means of the sensor.

A further embodiment of a machine tool according to the invention is characterized in that the reference position of the tool relative to the workpiece is determined from a diameter of the circular groove to be measured by means of the sensor.

In these further embodiments of the methods and machine tool according to the invention, a reference position occupied by the tool relative to the axis of rotation of the workpiece can be measured in a simple, accurate, and fast manner. When the sensor is displaced in a straight line which intersects the axis of rotation of the second holder and which is parallel to the X-axis by means of the positioning device, the circular groove is detected in two diametrically opposed positions by the sensor. The diameter of the circular groove can be measured by the sensor in that the two positions of the positioning device are determined in which the circular groove is detected by the sensor. The reference position of the tool relative to the axis of rotation of the workpiece then corresponds to half the measured diameter.

A still further embodiment of a method according to the invention for measuring a reference position of a tool relative to a workpiece, and a still further embodiment of a method according to the invention for manufacturing a workpiece by means of a tool, are characterized in that an optical detector is used as the sensor, by means of which a side wall of the circular groove is detected.

A still further embodiment of a machine tool according to the invention is characterized in that the optical detector detects a side wall of the circular groove.

The side wall of the circular groove forms a stepwise boundary of the groove which is detectable by means of the optical detector in a particularly accurate manner. In addition, a position of a working point of the tool relative to the side wall is accurately defined, so that a reference position of the working point of the tool relative to the workpiece can be measured in a particularly accurate manner.

It is noted that the article "An Ultra-Precision Machining Method or the Workpiece-Referred Form Accuracy Control System" in "Proceedings of the International Conference on Advanced Mechatronics, May 21–24, 1989, Tokyo, Japan, pp. 143–146" discloses a machine tool with a diamond cutting tool and an optical sensor which are fastened to a common Z-slide. In this known machine tool, the cutting tool is fastened to the Z-slide via a micro-actuator, which is not described in any detail, so that the cutting tool and the sensor are not fastened in fixed, permanent positions relative to one another and relative to the Z-slide during operation. Nothing is stated in this article about the mechanical stiffness and hysteresis of the micro-actuator, so that it is not clear how accurate the position of the cutting tool relative to the sensor and to the Z-slide is in a given position of the micro-actuator. In addition, the optical sensor is not used for detecting the presence of a distinguishing mark on the workpiece, but the optical sensor measures a distance between the Z-slide and a surface of the workpiece, while the sensor forms part of a control system by means of which the distance is kept constant.

BRIEF DESCRIPTION OF THE DRAWING FIGURES

Figure 2:
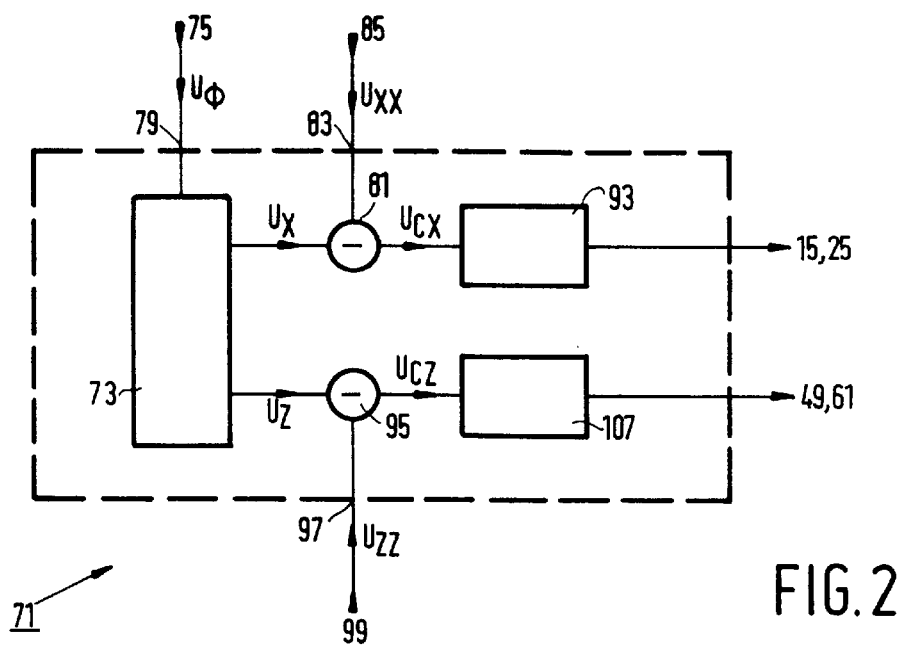
Figure 3:
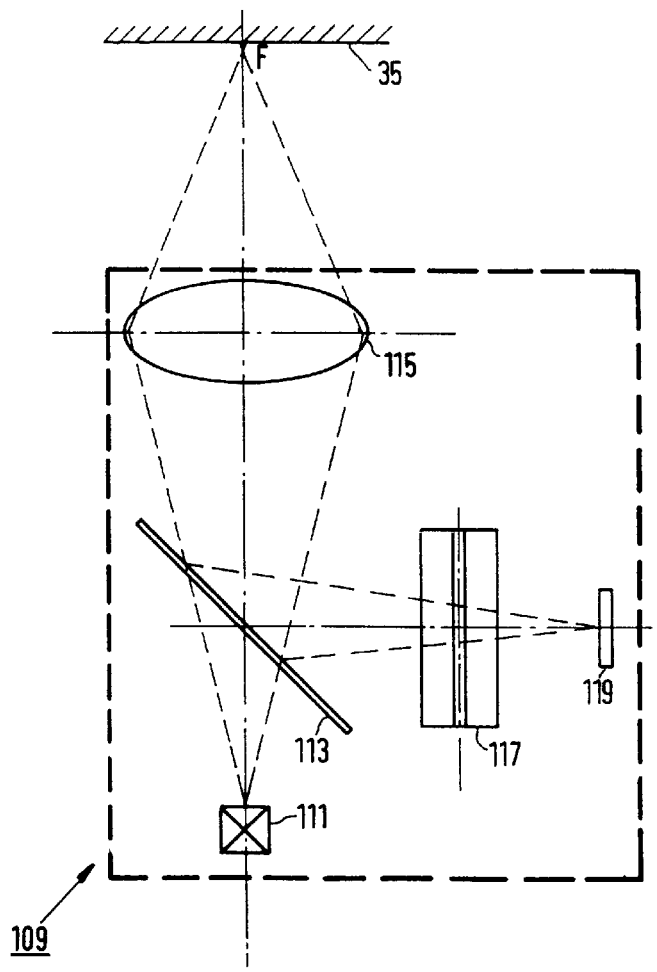
Figure 4A:
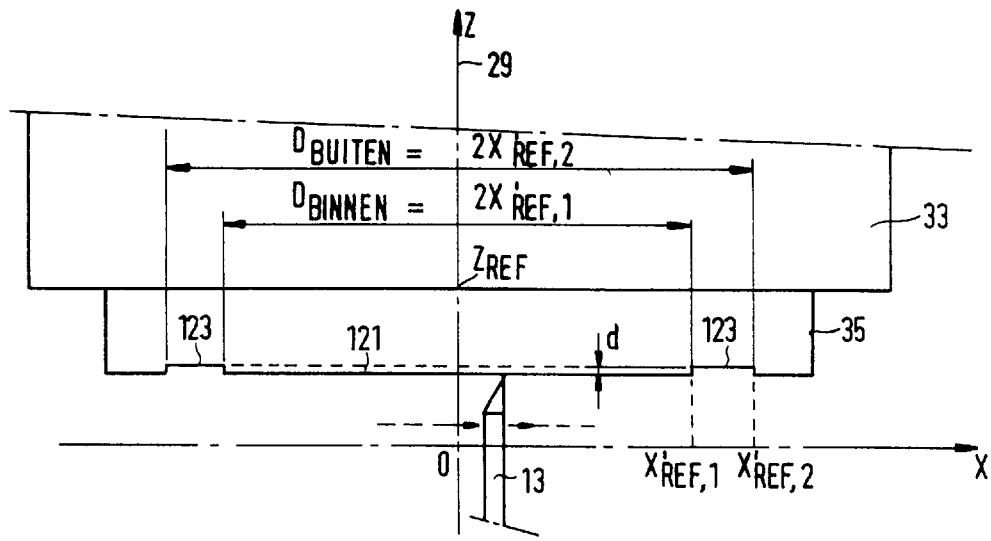
Figure 4B:
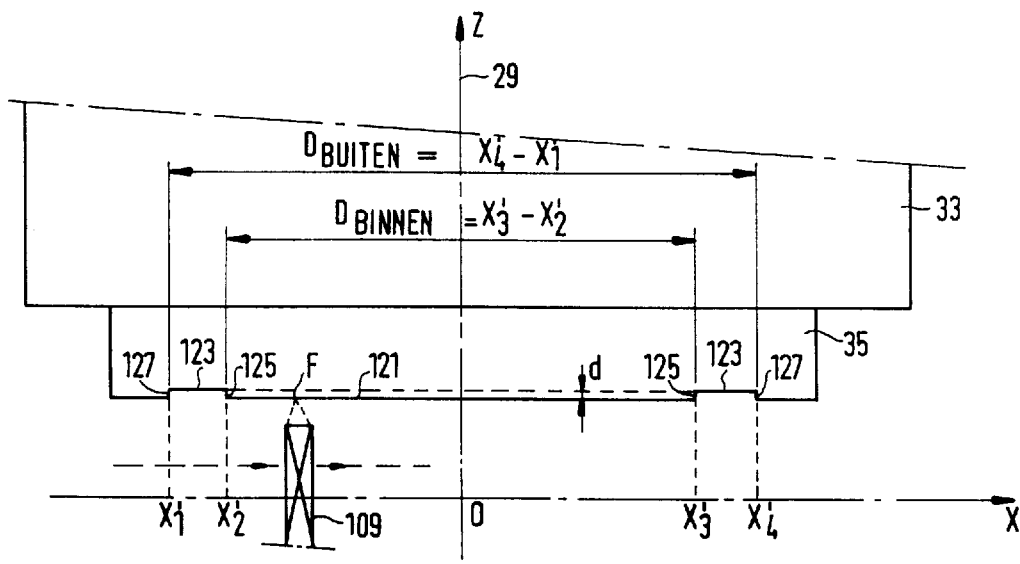
Figure 5:
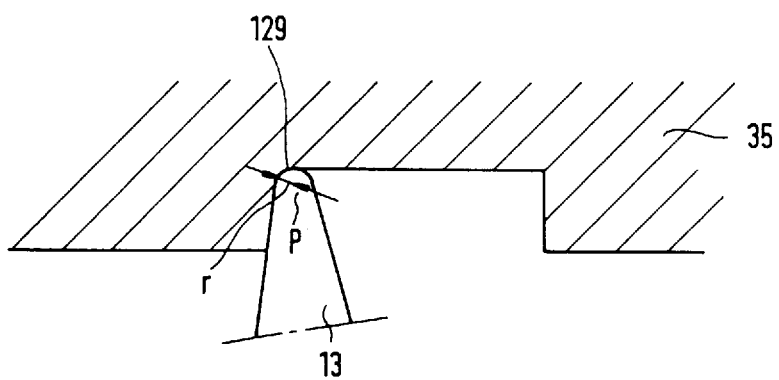
Figure 6:
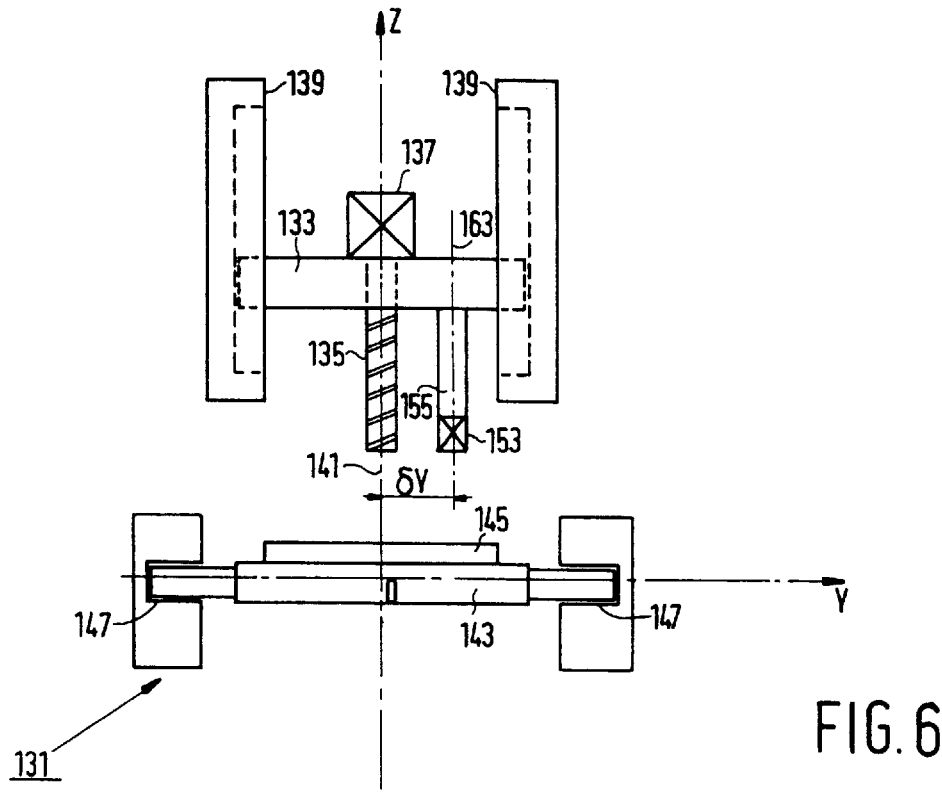
Figure 8:
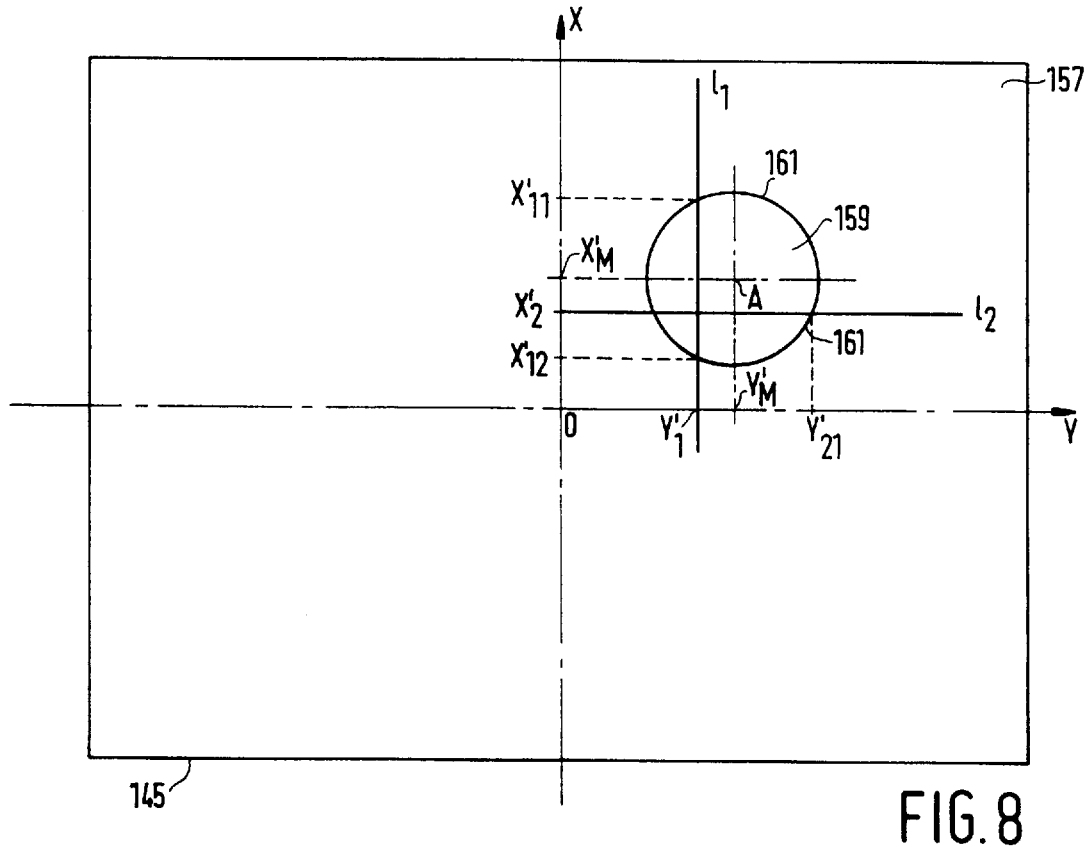
Figure 7:
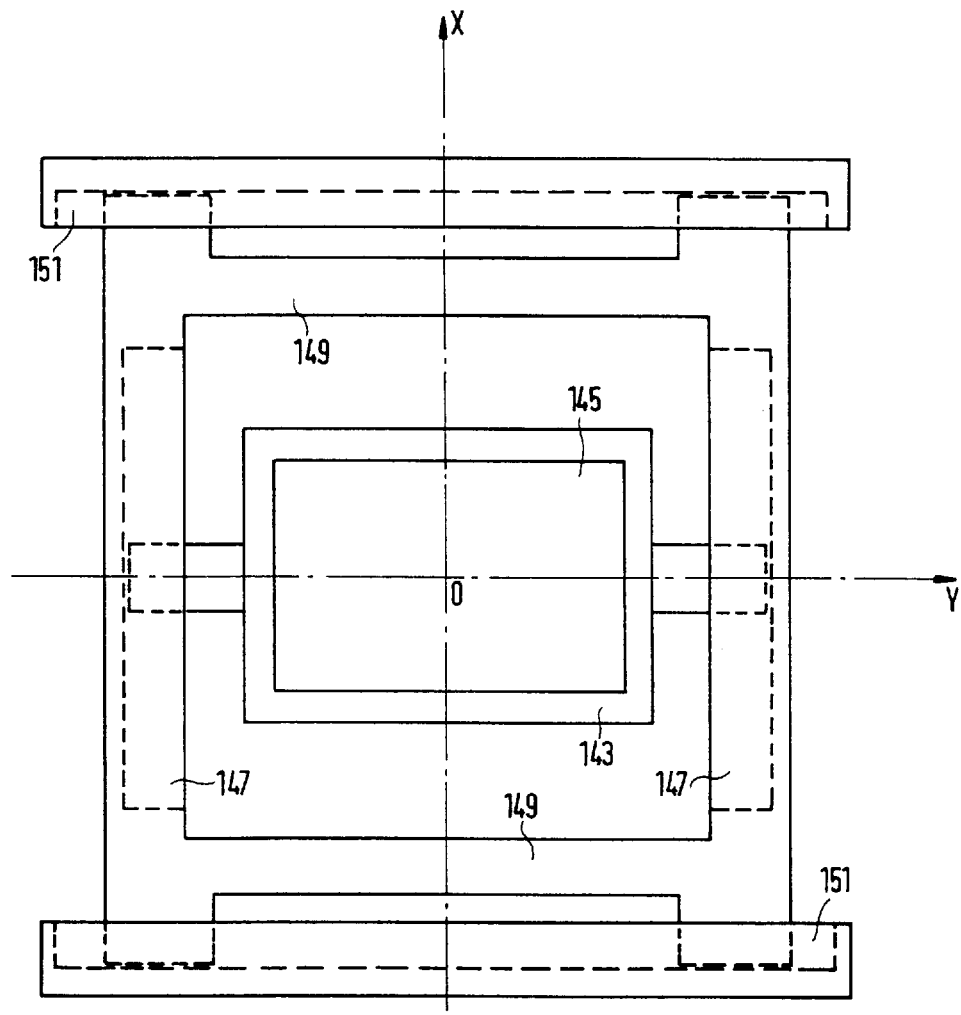

The invention will be explained in more detail below with reference to the drawings, in which FIG. 1 diagrammatically shows a first embodiment of a machine tool for carrying out a method according to the invention, FIG. 2 shows a control member of the machine tool of FIG. 1, FIG. 3 diagrammatically shows an optical detector of the machine tool of FIG. 1, FIG. 4a diagrammatically shows a workpiece to be manufactured by means of the machine tool shown in FIG. 1, in which workpiece a distinguishing mark is provided by the method according to the invention, FIG. 4b illustrates the detection of the distinguishing mark of FIG. 4a, FIG. 5 in detail shows a tool of the machine tool shown in FIG. 1 during the application of the distinguishing mark shown in FIG. 4, FIG. 6 diagrammatically shows a second embodiment of a machine tool for carrying out a method according to the invention, FIG. 7 shows a holder for a workpiece belonging to the machine tool of FIG. 6, and FIG. 8 diagrammatically shows a workpiece to be manufactured by means of the machine tool shown in FIG. 6, in which workpiece a distinguishing mark is provided by the method according to the invention.

DESCRIPTION OF THE INVENTION

The first embodiment of a machine tool 1 for carrying out a method according to the invention as shown in FIG. 1 is provided with a frame 3 which can be placed on a base surface. On the frame 3, there is a guide block 5 with a straight guide 7 extending parallel to an X-axis. The machine tool 1 comprises a slide 9 which is displaceably guided along the guide 7 by means of a static fluid bearing (not visible in FIG. 1). A first holder 11 for a tool such as, for example, a cutting tool 13 is arranged on the slide 9. The slide 9 is displaceable along the guide 7 by means of a positioning device 15, so that the first holder 11 with the cutting tool 13 is displaceable parallel to the X-axis. The positioning device 15 comprises a drive rod 17 extending parallel to the X-axis and coupled to the slide 9, which rod is guided in a housing 19 fastened to the frame 3 by means of a number of guide wheels 21 which are shown diagrammatically only in FIG. 1. A friction wheel 23, which has its rotation bearings in the housing 19 and can be driven by an electric motor 25 fastened to the housing 19, bears under pretension on the drive rod 17, so that the slide 9 is displaceable parallel to the X-axis by means of the motor 25 via the drive rod 17 and the friction wheel 23.

As FIG. 1 further shows, the machine tool 1 comprises a spindle 27 which extends parallel to a Z-axis directed perpendicularly to the X-axis and which is rotatable about an axis of rotation 29 which coincides with the Z-axis. The X-axis and Z-axis intersect one another in an origin O of the system of coordinates (X,Z) which lies on the axis of rotation 29. Near a first end 31, the spindle 27 is provided with a second holder 33 to which a workpiece 35 may be mounted. The spindle 27 comprises a hollow shaft 37 which is supported in a direction perpendicular to the Z-axis by means of a radial static fluid bearing 39 which is shown diagrammatically only in FIG. 1. The spindle 27 is coupled to a positioning device 49 via an axial static fluid bearing 41 which is not shown in any detail in FIG. 1 and which comprises bearing surfaces 43 and 45 which extend substantially perpendicularly to the axis of rotation 29 and via an elastically deformable coupling member 47. The spindle 27 is supported and pretensioned by means of the axial fluid bearing 41 in a direction parallel to the Z-axis. Owing to the use of the coupling member 47, which is of a type known from EP-A-0 602 724, the axial fluid bearing 41 is pivotable relative to a point of intersection 51 of the bearing surface 43 with the axis of rotation 29, so that inaccuracies in the perpendicularity relative to the axis of rotation 29 of the bearing surfaces 43 and 45 of the axial fluid bearing 41 during rotation of the spindle 27 about the axis of rotation 29 have no influence on the position of the spindle 27 parallel to the Z-axis.

The positioning device 49 mentioned above comprises a drive rod 53 which extends parallel to the Z-axis and which is fastened to the coupling member 47. The drive rod 53 is guided along a number of guide wheels 55 shown diagrammatically only in FIG. 1 which have their rotation bearings in a housing 57 fastened to the frame 3. The positioning device 49 further comprises a friction wheel 59 which also has its rotation bearings in the housing 57 and can be driven by an electric motor 61 fastened to the housing 57. The friction wheel 59 bears with pretension on the drive rod 53, so that the spindle 27 can be displaced parallel to the Z-axis by the motor 61 via the friction wheel 59, the drive rod 53, the coupling member 47, and the axial fluid bearing 41. As FIG. 1 further shows, the spindle 27 is rotatable about the axis of rotation 29 by means of a further electric motor 63 which is also fastened to the frame 3 and which is coupled to the hollow shaft 37 via a pulley 65, a rope 67, and a further pulley 69 which is integral with the hollow shaft 37. The rope 67 has sufficient elasticity for following a displacement of the hollow shaft 37 and the further pulley 69 parallel to the Z-axis.

The workpiece 35 can be machined by means of the cutting tool 13 in that the second holder 33 with the workpiece 35 is rotated about the axis of rotation 29 by means of the motor 63, the first holder 11 with the cutting tool 13 is displaced in a suitable manner parallel to the X-axis by means of the positioning device 15, and the second holder 33 with the workpiece 35 is displaced in a suitable manner parallel to the Z-axis by means of the positioning device 49. If the consecutive Z-positions of the second holder 33 depend exclusively on the X-position of the first holder 11, the workpiece 35 is provided with a surface which is rotationally symmetrical relative to the axis of rotation 29. If the consecutive Z-positions of the second holder 33 also depend on an angle of rotation of the spindle 27 around the axis of rotation 29, the workpiece 35 is provided with a surface which is not rotationally symmetrical relative to the axis of rotation 29. The workpiece 35 may be, for example, a plastic lens or contact lens which is thus provided with a rotationally symmetrical spherical or aspherical surface, or with a rotationally asymmetrical astigmatic surface, a mould for manufacturing such a lens by a replica method, or a bearing surface of an axial dynamic groove bearing.

FIG. 2 shows a control member 71 of the machine tool 1 by means of which the positioning devices 15 and 49 are controllable. The control member 71 comprises a contour generator 73 which generates a first signal $u_x$ in accordance with a previously defined program, corresponding to a desired X-position of the first holder 11 with the cutting tool 13, and a second signal $u_z$ corresponding to a desired Z-position of the second holder 33 with the workpiece 35. The signal $u_z$ is calculated by the contour generator 73 in accordance with a mathematical algorithm as a function of the desired X-position of the cutting tool 13 and a measured angle of rotation φ of the spindle 27 around the axis of rotation 29. As FIG. 1 shows, the machine tool 1 for this purpose comprises an optical rotation angle sensor 75 of a kind which is usual and known per se and which is fastened near a second end 77 of the spindle 27, while the control member 71 has a first electrical input 79, shown in FIG. 2, for receiving a first electrical input signal $u_φ$ which corresponds to the angle of rotation φ of the spindle 27 around the axis of rotation 29 measured by the rotation angle sensor 75.

As FIG. 2 further shows, the control member 71 comprises a first comparator 81 which compares the first signal $u_x$, which corresponds to a desired X-position of the first holder 11 with the cutting tool 13 calculated by the contour generator 73, with a second electrical input signal $u_{xx}$, which corresponds to a measured X-position of the first holder 11 and which is received by a second electrical input 83 of the control member 71. The second electrical input signal $u_{xx}$ is supplied by a first optical position sensor 85, which is usual and known per se and which is shown diagrammatically only in FIG. 1, provided with an optical source 87 and an optical detector 89 which are fastened to the housing 19 of the positioning device 15, and provided with a reflecting surface 91 fastened to the slide 9 of the positioning device 15. As FIG. 2 shows, the first comparator 81 supplies a differential signal $u_{cx}=u_{xx}-u_x$ which is offered to a first controller 93, usual and known per se, which supplies the electric motor 25 of the positioning device 15 such that the differential signal becomes $u_{cx}=0$, and the measured and desired X-positions of the first holder 11 with the cutting tool 13 become equal.

As FIG. 2 further shows, the control member 71 also comprises a second comparator 95 which compares the second signal $u_z$, which corresponds to a desired Z-position of the second holder 33 with the workpiece 35 calculated by the contour generator 73, with a third electrical input signal $u_{zz}$ which corresponds to a measured Z-position of the second holder 33 and which is received by a third electrical input 97 of the control member 71. The third electrical input signal $u_{zz}$ is supplied by a second optical position sensor 99, usual and known per se and again shown diagrammatically only in FIG. 1, provided with an optical source 101 and an optical detector 103 which are fastened to the housing 57 of the positioning device 49, and provided with a reflecting surface 105 fastened to the drive rod 53 of the positioning device 49. As FIG. 2 shows, the second comparator 95 supplies a differential signal $u_{cz}=u_{zz}-u_z$ which is offered to a second controller 107, usual and known per se, which supplies the electric motor 61 of the positioning device 49 such that the differential signal becomes $u_{cz}=0$, i.e. the measured and desired Z-positions of the second holder 33 with the workpiece 35 become equal.

Since the friction wheels 23, 59 of the positioning devices 15, 49 bear with pretension on the drive rods 17, 53, while the slide 9 and the spindle 27 are guided relative to the frame 3 by means of static fluid bearings, the first holder 11 and the second holder 33 are movable relative to one another substantially without friction, play and hysteresis by means of the positioning devices 15, 49. As a result of this, and of a suitable design of the controllers 93, 107 of the control member 71, the first holder 11 and the second holder 33 can be positioned relative to one another with a positioning accuracy which lies in the sub-micron range, i.e. with positioning accuracies of the order of 0.1 μm or better. Since an achievable dimensional accuracy of the workpiece 35 is determined by a positioning accuracy of the cutting tool 13 relative to the workpiece 35, and since a position of the cutting tool 13 relative to the workpiece 35 depends on the position of the first holder 11 relative to the second holder 33 and on a reference position of the cutting tool 13 relative to the workpiece 35, the workpiece 35 has a dimensional accuracy which also lies in the sub-micron range, provided said reference position of the cutting tool 13 relative to the workpiece 35 is measurable with an accuracy in the sub-micron range.

The contour generator 73 of the control member 71 of the machine tool 1 has a control program by means of which the reference position of the cutting tool 13 relative to the workpiece 35 is measured in a manner to be described in detail below. The machine tool 1 for this purpose also comprises a sensor 109, shown diagrammatically in FIG. 3 and fastened to the first holder 11 as shown in FIG. 1. The sensor 109 is an optical detector of a kind known per se from compact disc players, where the sensor is used in a control system for focusing an optical read member on an information-carrying surface of a compact disc to be read and for positioning the optical read member in a direction perpendicular to an information track on the compact disc which is to be followed by the read member. As FIG. 3 shows, the sensor 109 comprises a light source 111, a semi-transparent plate 113, an objective lens system 115 for focusing light radiated by the light source 111 on a surface of the workpiece 35, a cylindrical lens 117, and a focusing error detector 119 subdivided into four quadrants. The operation of such a sensor is described in "Principles of Optical Disc Systems" by G. Bouwhuis et al., Adam Hilger Ltd, Bristol, ISBN 0-85274-785-3. The focusing error detector 119 of the sensor 109 detects whether the focus F of the light radiated by the light source 111 and reflected back by a surface of the workpiece 35 lies on the surface of the workpiece 35. Such a focusing error detector 119 supplies an electrical output signal which is comparatively strong compared with the detected focusing error, for example, an output voltage of 10 V for a focusing error of 10 $\mu$m, i.e. it has a high sensitivity.

The cutting tool 13 and the sensor 109 are fastened in fixed, permanent positions relative to one another and relative to the first holder 11. The cutting tool 13 and the sensor 109 are for this purpose fastened to the first holder 11 by means of, for example, bolt connections which are usual and known per se and which are not shown in any detail in FIG. 1. Since the cutting tool 13 and the sensor 109 are fastened in fixed, permanent positions relative to one another and relative to the first holder 11, the accuracy of the position of the cutting tool 13 relative to the sensor 109 depends on the mechanical stiffness and coefficient of thermal expansion of the first holder 11. It is achieved by a suitable design of the first holder 11 and a suitable choice of the fastening positions of the cutting tool 13 and the sensor 109 to the first holder 11 that the position of the cutting tool 13 relative to the sensor 109 has an accuracy which is comparatively high in relation to the desired dimensional accuracy of the workpiece 35.

According to the control program of the control member 71, the reference position of the cutting tool 13 relative to the workpiece 35 is measured as follows. First the rotating workpiece 35 is provided with a surface 121, shown in FIG. 4a and extending perpendicularly to the axis of rotation 29, in that the cutting tool 13 is displaced parallel to the X-axis in a predetermined reference position $Z_{REF}$ of the second holder 33 by means of the positioning device 15. Subsequently, the workpiece 35 is provided with a circular groove 123, shown in FIG. 4a, by the cutting tool 13 in that the first holder 11 with the cutting tool 13 is displaced by the positioning device 15 into a predetermined first reference position $X_{REF,1}$ of the positioning device 15, in that then the cutting tool 13 is inserted into the rotating workpiece 35 to a predetermined cutting depth d by means of a suitable displacement of the second holder 33 parallel to the Z-axis, and in that then the first holder 11 with the cutting tool 13 is displaced by the positioning device 15 parallel to the X-axis into a predetermined second reference position $X_{REF,2}$ of the positioning device 15. As FIG. 4a shows, the cutting tool 13 is in a first reference position $X'_{REF,1}$, and in a second reference position $X'_{REF,2}$ relative to the workpiece 35 when the first holder 11 is in the first and second reference positions $X_{REF,1}$ and $X_{REF,2}$, respectively, so that an internal diameter $D_{INNER}$ of the circular groove 123 equals $2*X'_{REF,1}$, and an external diameter of the circular groove 123 equals $2*X'_{REF,2}$.

The circular groove 123 forms a distinguishing mark of the workpiece 35 which is detected by the sensor 109 in accordance with said control program. As FIG. 4b shows, the sensor 109 is for this purpose focused on the surface 121 of the workpiece 35 through a suitable displacement of the second holder 33 according to the control program. Subsequently, the sensor 109 is displaced parallel to the X-axis by the positioning device 15 along a straight line which intersects the axis of rotation 29 of the second holder 33, while the Z-position of the second holder 33 with the workpiece 35 remains constant. When the sensor 109 passes an inner side wall 125 or an outer side wall 127 of the circular groove 123 during this, said inner side wall 125 or outer side wall 127 is detected by the sensor 109 because the sensor 109 is then no longer focused on the surface 121 of the workpiece 35, and the focusing error detector 119 detects a focusing error. As FIG. 4b shows, the inner side wall 125 and the outer side wall 127 of the circular groove 123 are each detected twice by the sensor 109 during the displacement of the sensor 109 parallel to the surface 121 of the workpiece 35. The X-positions of the first holder 11 and the positioning device 15 in which the sensor 109 detects the inner side wall 125 of the circular groove 123 are called $X'_2$ and $X'_3$, while the X-positions of the first holder 11 and the positioning device 15 in which the sensor 109 detects the outer side wall 127 of the circular groove 123 are called $X'_1$ and $X'_4$. The control program then determines the first reference position $X'_{REF,1}$ of the cutting tool 13 relative to the workpiece 35 from the diameter $D_{INNER}$ of the inner side wall 125 of the circular groove 123, where $D_{INNER}=X'_3-X'_2$, and where $X'_{REF,1}=D_{INNER}/2=(X'_3-X'_2)/2$, while the control program determines the second reference position $X'_{REF,2}$ of the cutting tool 13 relative to the workpiece 35 from the diameter $D_{OUTER}$ of the outer side wall 127 of the circular groove 123, where $D_{OUTER}=X'_4-X'_1$, and where $X'_{REF,2}=D_{OUTER}/2=(X'_4-X'_1)/2$. Since the sensor 109 and the cutting tool 13 are fastened in fixed, permanent positions relative to the first holder 11 and relative to one another during this measuring procedure and are displaced parallel to the X-axis by the positioning device 15, the accuracy with which the reference positions $X'_{REF,1}$ and $X'_{REF,2}$ of the cutting tool 13 relative to the workpiece 35 are measured is determined by the positioning accuracy of the positioning device 15 which lies, as noted above, in the sub-micron range.

Owing to deviations, constant per se, in the position of the cutting tool 13 relative to the first holder 11, of the first holder 11 relative to the positioning device 15, of the positioning device 15 relative to the frame 3 of the machine tool 1, and of the second holder 33 relative to the frame 3 of the machine tool 1, the measured reference positions $X'_{REF,1}$ and $X'_{REF,2}$ of the cutting tool 13 relative to the workpiece 35 deviate from the reference positions $X_{REF,1}$ and $X_{REF,2}$ of the positioning device 15 in which the inner side wall 125 and the outer side wall 127, respectively, of the circular groove 123 were made by the cutting tool 13. When the workpiece 35 is machined by the cutting tool 13, the first holder 11 with the cutting tool 13 is moved into consecutive X-positions X' by the positioning device 15, and the second holder 33 with the workpiece 35 is moved into consecutive Z-positions Z' by the positioning device 49, which consecutive X- and Z-positions X' and Z' are determined by the contour generator 73. According to the control program, the consecutive X-positions X' then each correspond to a sum of a desired X-position X of the first holder 11 of the positioning device 15 put in by a user of the machine tool 1 into the control program and a difference $\delta X_{REF}$ between a reference position $X_{REF}$ of the first holder 11 of the positioning device 15 and a measured reference position $X'_{REF}$ of the cutting tool 13 relative to the workpiece 35. The reference position $X_{REF}$ of the first holder 11 of the positioning device 15 then is an average of said first and second reference positions $X_{REF,1}$ and $X_{REF,2}$; $X_{REF}=(X_{REF,1}+X_{REF,2})/2$, while the measured reference Position $X'_{REF}$ of the cutting tool 13 relative to the workpiece is an average of the measured first and second reference positions $X'_{REF,1}$ and $X'_{REF,2}$; $X'_{REF}=(X'_{REF,1}+X'_{REF,2})/2$, so that $X'=X+\delta X_{REF}=X+(X_{REF}-X'_{REF})=X+(X_{REF,1}-X'_{REF,1})/2+(X_{REF,2}-X'_{REF,2})/2$. Since the consecutive X-positions X' of the first holder 11 of the positioning device 15 each correspond to said sum of the X-position X desired by the user and the difference between the reference position of the first holder 11 of the positioning device 15 and the measured reference position of the cutting tool 13 relative to the workpiece 35, it is achieved that in the X-position X' of the positioning device 15 the cutting tool 13 is in an X-position relative to the workpiece 35 which corresponds to an X-position X desired by the user. Since the desired X-position X of the positioning device 15 is adjustable to an accuracy in the sub-micron range, and also the reference positions $X_{REF}$ and $X'_{REF}$ are measurable with an accuracy in the sub-micron range, the X-position X' is adjustable to an accuracy in the sub-micron range, so that the cutting tool 13 can be positioned relative to the workpiece 35, and the workpiece 35 can be machined by the cutting tool 13 with an accuracy in the sub-micron range.

It is noted that a position of the cutting tool 13 relative to the workpiece 35 is understood to mean a position of a tool tip P of the cutting tool 13 as shown in FIG. 5. The tool tip P forms a centre of a rounded cutting edge 129 of the cutting tool 13 which has a radius of curvature r. It is noted that the reference position of the cutting tool 13 relative to the workpiece 35 is also corrected in a manner known per se and in general use for the shape of the cutting edge 129 of the cutting tool 13, which shape of the cutting edge 129 is previously measured with an accuracy in the sub-micron range and incorporated in the control program.

FIG. 6 diagrammatically shows a second embodiment of a machine tool 131 for carrying out a method according to the invention. The machine tool 131 comprises a first holder 133 for a milling tool 135 which is journalled relative to the first holder 133 and can be driven into rotation by means of an electric motor 137 fastened to the first holder 133. The first holder 133 is displaceable by means of a positioning device not shown in any detail in FIG. 6 along a first straight guide 139 which is shown diagrammatically only and which extends parallel to a Z-axis, which Z-axis coincides with an axis of rotation 141 of the milling tool 135. As FIG. 6 further shows, the machine tool 131 comprises a second holder 143 to which a workpiece 145 to be machined by the milling tool 135 can be fastened. The second holder 143 is shown diagrammatically in plan view in FIG. 7. As FIG. 7 shows, the second holder 143 is displaceable by means of a positioning device not shown in any detail in FIG. 7 along a second straight guide 147 which is shown diagrammatically only and which extends parallel to an X-axis directed perpendicularly to the Z-axis. The second straight guide 147 is fastened to a slide 149 which is displaceable by means of a further positioning device not shown in any detail in FIG. 7 along a third straight guide 151, also shown diagrammatically only and extending parallel to a Y-axis directed perpendicularly to the Z-axis and X-axis. As FIGS. 6 and 7 show, the X-axis, Y-axis, and Z-axis intersect one another in an origin O of the system of coordinates (X, Y, Z) which lies on the axis of rotation 141.

The workpiece 145 can be machined by means of the milling tool 135 in that the milling tool 135 is rotated about the axis of rotation 141 by the electric motor 137, the first holder 133 with the milling tool 135 is displaced in a suitable manner parallel to the Z-axis, and the second holder 143 with the workpiece 145 is displaced in a suitable manner parallel to the X-axis and Y-axis. The second embodiment of the machine tool 131 comprises, as does the first embodiment 1, a control member not shown in any detail in the Figures with a control program by means of which a reference position of the workpiece 145 relative to the milling tool 135 is measured. As FIG. 6 shows, the machine tool 131 for this purpose comprises a sensor 153 which is of a kind similar to the sensor 109 of the machine tool 1, while the milling tool 135 and the sensor 153 are fastened, as are the cutting tool 13 and the sensor 109 of the machine tool 1, in fixed, permanent positions relative to the first holder 133 and relative to one another. As FIG. 6 shows, the sensor 153 is for this purpose fastened to a sensor holder 155 which is fastened in a fixed, permanent position relative to the first holder 133.

It will now be briefly explained how the reference position of the workpiece 145 relative to the milling tool 135 is measured by means of the control program of the machine tool 131. First the workpiece 145, like the workpiece 35 of machine tool 1, is provided with a surface 157 extending perpendicularly to the Z-axis and shown in FIG. 8 in that the workpiece 145 is displaced in a plane perpendicular to the Z-axis in a predetermined reference position $Z_{REF}$ of the first holder 133 with the rotating milling tool 135 by means of the positioning devices of the second holder 143. Subsequently, a cylindrical distinguishing mark 159 shown in FIG. 8 is provided in the surface 157 thus formed on the workpiece 145 in that the workpiece 145 is placed in predetermined reference positions $X_{REF}$ and $Y_{REF}$ of the positioning devices of the second holder 143, and in that then the milling tool 135 provides a cylindrical recess in the surface 157 of the workpiece 145 through a suitable displacement of the first holder 133. The distinguishing mark 159 thus has a diameter which corresponds to a diameter of the milling tool 135. The workpiece 145 is in reference positions $X'_{REF}$ and $Y'_{REF}$ relative to the milling tool 135 when the positioning devices of the second holder 143 are in the reference positions $X_{REF}$ and $Y_{REF}$, so that an axis A of the cylindrical distinguishing mark 159 shown in FIG. 8 is in positions $X'_M=X'_{REF}+\delta X$, and $Y'_{M=YREF}+\delta Y$, where $\delta X$ is a distance, previously measured parallel to the X-axis and put in into the control program, between the axis of rotation 141 of the milling tool 135 and an optical axis 163 of the sensor 153, while $\delta Y$ is a distance, previously measured parallel to the Y-axis and put in into the control program, between the axis of rotation 141 of the milling tool 135 and the optical axis 163 of the sensor 153. Only the distance $\delta Y$ is visible in FIG. 6. Then the sensor 153 is focused on the surface 157 of the workpiece 145 through a suitable displacement of the first holder 133. After that, the workpiece 145 is first displaced parallel to the X-axis according to a first straight line $l_1$ shown in FIG. 8, while the Z-position of the first holder 133 is constant and the Y-position of the second holder 143 is $Y'_1$. The sensor 153 detects a side wall 161 of the distinguishing mark 159 twice during this. The positions of the second holder 143 in which the sensor 153 detects the side wall 161 of the distinguishing mark 159 during the displacement of the workpiece 145 along the line $l_1$, are indicated with $(X'_{11}, Y'_1)$ and $(X'_{12}, Y'_1)$. Subsequently, the workpiece 145 is displaced parallel to the Y-axis along a second straight line $l_2$ shown in FIG. 8, during which the Z-position of the first holder 133 is also constant and the X-position of the second holder 143 is $X'_2$. The moment the sensor 153 detects the side wall 161 of the distinguishing mark 159 during this, the displacement of the workpiece 145 along the straight line $l_2$ is stopped. The position of the second holder 143 in which the sensor 153 detects the side wall 161 of the distinguishing mark 159 during the displacement of the workpiece 145 along the line $l_2$ is indicated with $(X'_2, Y'_{21})$. The control program subsequently determines in a manner usual and known per se a position of the center of the circle which comprises the measured positions $(X'_{11}, Y'_1)$, $(X'_{12}, Y'_1)$ and $(X'_2, Y'_{21})$. The X-position and Y-position of the center correspond to said positions $X'_M$ and $Y'_M$ of the axis A of the distinguishing mark 159. The measured reference position $(X'_{REF}, Y'_{REF})$ of the milling tool 135 relative to the workpiece 145 is then calculated as $X'_{REF}=X'_M-\delta X$, and $Y'_{REF}=Y'_M-\delta Y$. As in the machine tool 1, the accuracy with which the reference positions $X'_{REF}$ and $Y'_{REF}$ of the milling tool 135 relative to the workpiece 145 are measured is determined by the positioning accuracy of the positioning devices of the second holder 143. Said positioning accuracy lies in the sub-micron range thanks to a suitable design of said positioning devices and of the control member of the positioning devices, so that said reference positions can be measured with an accuracy in the sub-micron range.

During the operation on the workpiece 145 by means of the milling tool 135, the second holder 143 with the workpiece 145 is displaced into consecutive X- and Y-positions X' and Y' which each correspond, according to the control program of the machine tool 131, to a sum of a desired X-position X of the second holder 143 put in into the control program by a user of the machine tool 131 and a difference $\delta X_{REF}$ between the reference position $X_{REF}$ of the second holder 143 and the measured reference position $X'_{REF}$ of the milling tool 135 relative to the workpiece 145, and to a sum of a desired Y-position Y of the second holder 143 put in into the control program by a user of the machine tool 131 and a difference $\delta Y_{REF}$ between the reference position $Y_{REF}$ of the second holder 143 and the measured reference position $Y'_{REF}$ of the milling tool 135 relative to the workpiece 145, respectively, so that $X'=X+\delta X_{REF}=X+(X_{REF}-X'_{REF})$, and $Y'=Y+\delta Y_{REF}=Y+(Y_{REF}-Y'_{REF})$. Since the desired X- and Y-positions X and Y of the second holder 143 are adjustable to an accuracy in the sub-micron range, and also the reference positions $X_{REF}$, $X'_{REF}$, $Y_{REF}$, and $Y'_{REF}$ are measurable with an accuracy in the sub-micron range, the X- and Y-positions X' and Y' are adjustable to an accuracy in the sub-micron range, so that the milling tool 135 can be positioned relative to the workpiece 145 and the workpiece 145 can be machined with the milling tool 135 with an accuracy in the sub-micron range.

The machine tool 1 described above machines a rotating workpiece 35 with a cutting tool 13, whereas the machine tool 131 described above machines a workpiece 145 with a rotating milling tool 135. It is noted that the method according to the invention is also applicable to other types of machine tools in which a workpiece is machined with a tool, and the workpiece and the tool are displaced relative to one another. Thus the method may be used, for example, in a machine tool where the tool is a laser cutter, or in a machine tool where the tool is a spark erosion cutter.

The first holder 11 with the cutting tool 13 of machine tool 1 is displaceable parallel to an X-axis, while the second holder 33 with the workpiece 35 is rotatable about a Z-axis and is displaceable parallel to the Z-axis. The first holder 133 with the milling tool 135 of the machine tool 131 is displaceable parallel to a Z-axis, while the milling tool 135 is rotatable about the Z-axis, and the second holder 143 with the workpiece 145 is displaceable parallel to the X-axis and to the Y-axis. It is noted that the method according to the invention is also applicable to machine tools in which the first holder with the tool and the second holder with the workpiece are displaceable relative to one another in some other way. Thus the method may also be used, for example, in a machine tool where the first holder with the tool is displaceable parallel to an X-axis and a Z-axis, while the second holder with the workpiece is rotatable about the Z-axis, or in a machine tool where the first holder is displaceable parallel to an X-axis and a Z-axis, while the second holder is drum-shaped and is rotatable about an axis of rotation which is parallel to the X-axis.

The machine tool 1 provides a circular groove 123 as a distinguishing mark according to the method, while the machine tool 131 provides a cylindrical recess 159 as a distinguishing mark. It is noted that the distinguishing mark according to the method may alternatively have a different shape or geometry, the shape and geometry of the distinguishing mark generally being dependent on the type of machine tool and the type of tool. Thus, for example, in the machine tool with a drum-shaped second holder as described in the preceding paragraph, the distinguishing mark may be a circular groove with a centreline which coincides with said axis of rotation of the drum-shaped second holder.

It is finally noted that, instead of the optical sensors 109, 153 described above, an alternative type of sensor may be used such as, for example, a mechanical feeler which is usual and known per se, an electrical capacitive sensor, or an electrical inductive sensor.

We claim:

1. A method of measuring a reference position of a tool, which is fastened to a first holder of a machine tool, relative to a workpiece to be manufactured by means of said tool, which workpiece is fastened to a second holder of the machine tool, said holders being displaced relative to one another by means of a positioning device, by which method a distinguishing mark is applied to the workpiece by the tool in a previously determined reference position of the positioning device and subsequently a sensor and the workpiece are displaced relative to one another by the positioning device, the reference position of the tool relative to the workpiece being determined from a position of the positioning device in which the distinguishing mark is detected by the sensor, characterized in that the tool and the sensor are fastened in fixed, permanent positions relative to one another and relative to the first holder before the distinguishing mark is provided.

2. A method of manufacturing a workpiece by means of a tool, in which method a reference position of the workpiece relative to the tool is measured by a method as claimed in claim 1, characterized in that, for the purpose of manufacturing the workpiece, the positioning device is displaced into consecutive positions which each correspond to a sum of a position supplied to the positioning device and a difference between the reference position of the positioning device and the measured reference position of the tool relative to the workpiece.

3. A method as claimed in claim 2, in which method the second holder is rotated about an axis of rotation and the first holder is displaced relative to the second holder parallel to an X-axis directed perpendicularly to the axis of rotation by means of the positioning device, characterized in that the workpiece is provided with a surface which extends perpendicularly to the axis of rotation, while the distinguishing mark is a circular groove provided in said surface by the tool.

4. A method as claimed in claim 3, characterized in that the reference position of the tool relative to the workpiece is determined from a diameter of the circular groove which is measured by means of the sensor.

5. A method as claimed in claim 4, characterized in that an optical detector is used as the sensor, by means of which a side wall of the circular groove is detected.

6. A machine tool with a first holder for a tool, a second holder for a workpiece to be manufactured by means of said tool, a positioning device with which the holders are displaceable relative to one another, and a control member for controlling the positioning device, the positioning device being controllable by the control member, for the purpose of measuring a reference position of the tool relative to the workpiece, in accordance with a control program according to which the tool applies a distinguishing mark to the workpiece in a previously determined reference position of the positioning device, and the positioning device subsequently displaces a sensor and the workpiece relative to one another, the reference position of the tool relative to the workpiece being determined from a position of the positioning device in which the sensor detects the distinguishing mark, characterized in that the tool and the sensor are fastened in fixed, permanent positions relative to one another and relative to the first holder during operation.

7. A machine tool as claimed in claim 6, characterized in that, for the purpose of manufacturing the workpiece, the positioning device is displaceable into consecutive positions in accordance with the control program, which positions each correspond to a sum of a position of the positioning device supplied to the control program by a user of the machine tool and a difference between the reference position of the positioning device and the measured reference position of the tool relative to the workpiece.

8. A machine tool as claimed in claim 7, characterized in that the sensor is an optical detector.

9. A machine tool as claimed in claim 8, characterized in that the optical detector is provided with a light source, an objective lens system for focusing the light radiated by the light source onto the workpiece, and a focusing error detector.

10. A machine tool as claimed in claim 9, in which the second holder is rotatable about an axis of rotation and the first holder is displaceable relative to the second holder parallel to an X-axis directed perpendicularly to the axis of rotation by means of the positioning device, characterized in that the distinguishing mark is a circular groove which is provided by the tool in a surface of the workpiece which extends perpendicularly to the axis of rotation.

11. A machine tool as claimed in claim 10, characterized in that the reference position of the tool relative to the workpiece is determined from a diameter of the circular groove to be measured by means of the sensor.

12. A machine tool as claimed in claim 11, characterized in that the optical detector detects a side wall of the circular groove.

13. A method as claimed in claim 1, in which method the second holder is rotated about an axis of rotation and the first holder is displaced relative to the second holder parallel to an X-axis directed perpendicularly to the axis of rotation by means of the positioning device, characterized in that the workpiece is provided with a surface which extends perpendicularly to the axis of rotation, while the distinguishing mark is a circular groove provided in said surface by the tool.

14. A method as claimed in claim 3, characterized in that an optical detector is used as the sensor, by means of which a side wall of the circular groove is detected.

15. A method as claimed in claim 13, characterized in that an optical detector is used as the sensor, by means of which a side wall of the circular groove is detected.

16. A machine tool as claimed in claim 6, characterized in that the sensor is an optical sensor.

17. A machine tool as claimed in claim 6, in which the second holder is rotatable about an axis of rotation and the first holder is displaceable relative to the second holder parallel to an X-axis directed perpendicularly to the axis of rotation by means of the positioning device, characterized in that the distinguishing mark is a circular groove which is provided by the tool in a surface of the workpiece which extends perpendicularly to the axis of rotation.

18. A machine tool as claimed in claim 16, characterized in that the optical detector detects a side wall of the circular groove.

19. A machine tool as claimed in claim 17, characterized in that the optical detector detects a side wall of the circular groove.

* * * * *